United States Patent
Capkovic

(10) Patent No.: US 12,343,810 B1
(45) Date of Patent: Jul. 1, 2025

(54) WIRE COIL STABILIZER AND SAW GUIDE

(71) Applicant: Chris S. Capkovic, Union, MO (US)

(72) Inventor: Chris S. Capkovic, Union, MO (US)

(*) Notice: Subject to any disclaimer, the term of this patent is extended or adjusted under 35 U.S.C. 154(b) by 0 days.

(21) Appl. No.: 18/828,266

(22) Filed: Sep. 9, 2024

Related U.S. Application Data

(60) Provisional application No. 63/537,238, filed on Sep. 8, 2023.

(51) Int. Cl.
*B23D 51/04* (2006.01)

(52) U.S. Cl.
CPC .................. *B23D 51/04* (2013.01)

(58) Field of Classification Search
CPC ......... B23D 55/04; B23D 51/04; B21L 19/00; B27G 5/02; B27G 5/026; B26B 29/06
USPC ...... 30/90.4, 90.8, 92.5, 394, 506–509, 124, 30/90.1, 90.2; 83/452–456, 761–764, 83/767; 269/293–295
See application file for complete search history.

(56) References Cited

U.S. PATENT DOCUMENTS

| | | |
|---|---|---|
| 323,229 A | 7/1885 | Houghtok |
| 581,532 A | 4/1897 | Booth |
| 1,161,001 A | 11/1915 | Joseph |
| 1,215,775 A | 2/1917 | James |
| 1,377,266 A | 5/1921 | Mossberg |
| 1,801,363 A * | 4/1931 | Mueller ............... B21L 15/00 16/108 |
| 2,128,437 A * | 8/1938 | Stenwall ............... B21D 53/16 269/48 |
| 2,342,322 A * | 2/1944 | Ailstock ............... H02G 1/1297 30/372 |
| 2,731,085 A | 1/1956 | Broden |
| 3,018,806 A * | 1/1962 | Moore .................. B26B 29/063 83/609 |
| 3,202,418 A * | 8/1965 | Dare .................... B23D 49/002 269/290 |
| 4,024,748 A | 5/1977 | Yashiro |
| 4,152,963 A * | 5/1979 | Romanik ............... B26B 29/063 83/762 |
| 4,300,755 A * | 11/1981 | Potvin ..................... B27G 5/02 83/762 |
| 4,436,014 A * | 3/1984 | O'Neill ................. B27G 5/026 83/762 |
| 4,536,957 A * | 8/1985 | Britton ................. H02G 1/1217 81/9.4 |
| 4,924,843 A | 5/1990 | Waren |

(Continued)

FOREIGN PATENT DOCUMENTS

TW M616719 U * 2/2021 ............. B21L 19/00

OTHER PUBLICATIONS

Sawblok; https://www.etsy.com/listing/250575004/sawblok-tm-and-sawblok-deluxe-tm ; May 7, 2016.*

(Continued)

*Primary Examiner* — Laura M Lee
(74) *Attorney, Agent, or Firm* — Grace J. Fishel

(57) ABSTRACT

A wire coil stabilizer and saw guide for cutting jump rings from a coil of wire including a block with a half circle groove having a bottom slot for holding a coil of wire threaded on a jeweler's saw blade. A tracking plate with a slit aligned with the bottom slot for compressing the coil of wire in the groove and aligning a jeweler's saw blade with the coil of wire.

10 Claims, 8 Drawing Sheets

(56) References Cited

U.S. PATENT DOCUMENTS

| | | | |
|---|---|---|---|
| 5,555,758 A | | 9/1996 | Ellison et al. |
| 5,577,717 A | * | 11/1996 | Benson ................. B25B 5/06 |
| | | | 269/254 R |
| 6,435,497 B1 | * | 8/2002 | Borter ................. B23Q 3/104 |
| | | | 269/902 |
| 11,433,465 B2 | | 9/2022 | Hentz |
| 2010/0089115 A1 | | 4/2010 | Liu |
| 2022/0234122 A1 | * | 7/2022 | Hentz ................. B23D 47/04 |
| 2023/0160675 A1 | * | 5/2023 | Redman ............. B23Q 3/186 |
| | | | 33/628 |
| 2023/0321737 A1 | * | 10/2023 | Sickles ............... A61K 9/08 |
| | | | 83/13 |
| 2024/0226985 A1 | * | 7/2024 | Moellering ........... B26F 1/14 |

OTHER PUBLICATIONS

Flickr; https://www.flickr.com/photos/2rosesjewelry/2691040487/in/photostream/; Jul. 22, 2008.*

Small Chain Crafts; https://ar.pinterest.com/pin/688980443022335476/ 2024.*

Jewlers Gripping Tool; https://www.pinterest.com/pin/27936460191868238/ ; 2024.*

Jiffy Jump Ring Tool; https://kingsleynorth.com/jiffy-jump-ring-tool-43-115-1.html.html?gad_source=1&gclid=Cj0KCQiA57G5BhDUARIsACgCYnwn7pFOyoHdLZo5tlMi9y24-wCJpFq5M5CdoDg_-KF3AuZj7RTGWbwaAr3JEALw_wcB ; 2024.*

Jump Ring Making Kit; David Lee; https://www.youtube.com/watch?v=QM4wBj8X_9k; May 9, 2020.*

Pepetools Jump Ring Maker Cutting Box; https://pepetools.com/a/s/products/pepetools-jump-ring-maker-cutting-box-for-307-70a; 2020.*

Scroll Saw Jig for Cutting Jump Rings; https://www.pinterest.com/pin/243757398578444359/; 2024.*

Cut Jump Rings Simply Shoebox Studio; https://www.shoeboxstudio.com/2014/11/22/wind-cut-jump-rings-simply-efficiently/; Nov. 22, 2014.*

* cited by examiner

WIRE COIL STABILIZER AND SAW GUIDE

BACKGROUND OF THE INVENTION

Field of the Invention

The present invention relates to a stabilizer for holding a wire coil used in combination with a saw guide for a jeweler's saw.

Brief Description of the Prior Art

One of the essential skills needed by a silver smith or jeweler is the ability to cut jump rings. It is common practice for the jeweler to mount a bench block in a standard jeweler's bench clamp provided in a support or bench. The jeweler holds a spiral coil on the bench block with the fingers of one hand and uses the other hand to operate a saw in order to cut rings. It is extremely difficult for the jeweler to hold the spiral coil without turning or twisting the workpiece. Thus inaccuracies in the cut frequently occur because the spiral coil is not firmly held on the bench block. This may result in the cut ends not being square so that two ends do not sit flush for a neat and more secure finish when the ring is compressed. In addition injuries may occur to the hand holding the spiral coil from a saw cut.

BRIEF SUMMARY OF VARIOUS PREFERRED EMBODIMENTS OF THE INVENTION

In view of the above, it is an object of the present invention to provide a stabilizer for holding a wire coil during cutting of jump rings used in combination with a saw guide for a jeweler's saw. Other objects and features of the invention will be in part apparent and in part pointed out hereinafter.

In accordance with the invention, a wire coil stabilizer and saw guide comprises a combination of a longitudinally extending block and a tracking plate that straddles the block. The block has a rear end configured for attachment to a bench clamp with a groove running from a front end towards the rear end. The groove has a pair of angularly oriented sides for holding a wire coil with a bottom slot between the sides for receiving a saw blade with a removable stop at the front end of the groove.

The tracking plate has a central portion configured to fit inside the groove flanked by legs that straddle the block. The central portion of the tracking plate has a slot for receiving the saw blade with the wire coil threaded on the saw blade and pinched between the stop and the tracking plate.

In some embodiments, the stop is a pin received in first and second opposing apertures in the block at the front end. In other embodiments, the block has a third aperture in the front end for storing the pin when not in use. In still further embodiments, an underside of the block is notched at the rear end for insertion into a standard jeweler's bench clamp.

In other embodiments the clamp is specially design to fit a block with or without the notch. In those cases, the clamp may be formed from a foldable template having a rectangular base attached to a hexagonal member.

The invention summarized above comprises the constructions hereinafter described, the scope of the invention being indicated by the subjoined claims.

BRIEF DESCRIPTION OF THE SEVERAL VIEWS OF THE DRAWINGS

In the accompanying drawings in which one of various possible embodiments of the invention is illustrated, corresponding reference characters refer to corresponding parts throughout the several views of the drawings in which.

DETAILED DESCRIPTION OF AT LEAST ONE PREFERRED EMBODIMENT OF THE INVENTION

Figure 1:
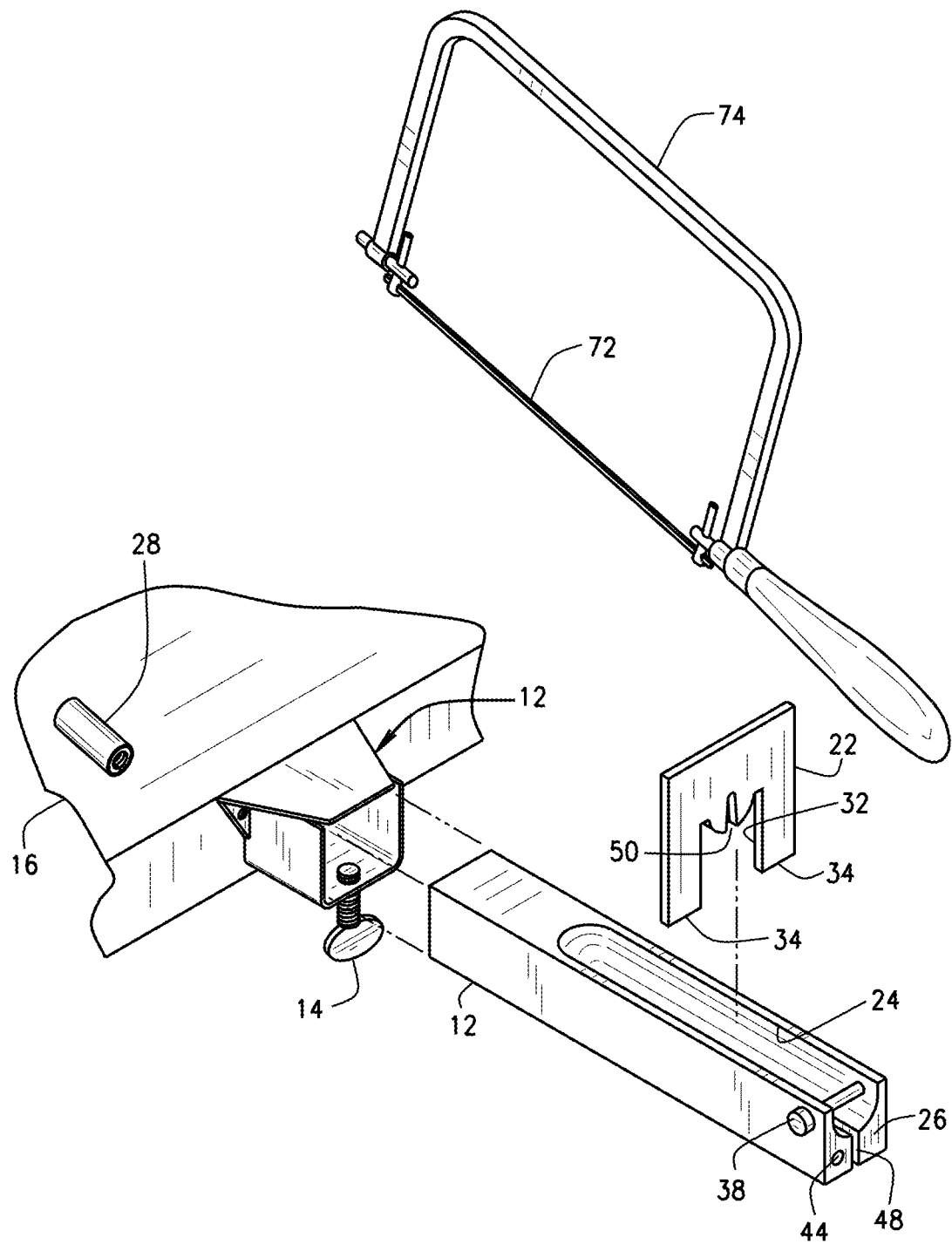
FIG. 1 is a perspective view of a first stabilizer for holding a wire coil in combination with a saw guide for attachment to a jeweler's bench with a first bench clamp.
Figure 5:
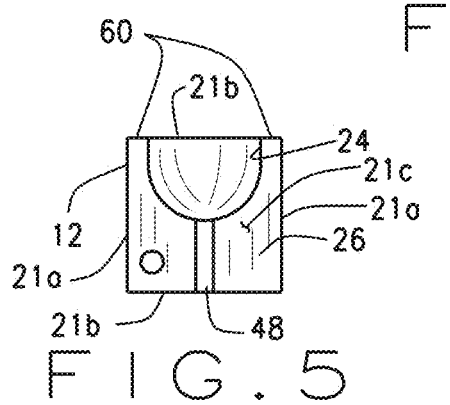
FIG. 5 is a front end view of the block.
Figure 6:
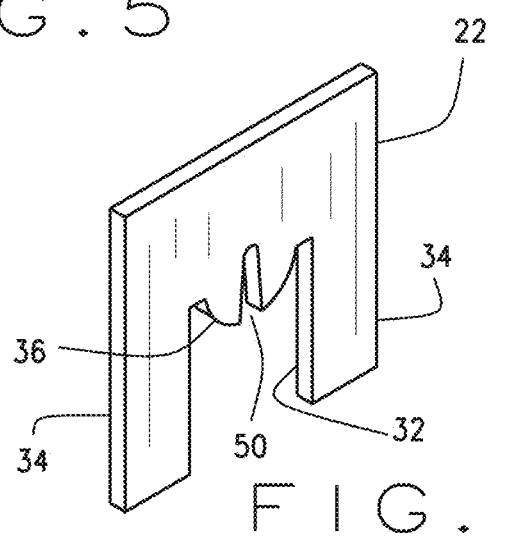
FIG. 6 is a perspective view of a tracking plate component.

Referring to the drawings more particularly by reference character, a wire coil stabilizer and saw guide 10 is shown in FIG. 1 for attachment to a bench clamp 12 shown attached with screw 14 to a jeweler's work bench 16. Wire coil stabilizer portion 18 of unit 10 includes a longitudinally extending block 20 with a tracking plate 22. As shown in FIG. 5 with side faces 21*a*, top and bottom faces 21*b* and end faces 21*c*, block 20 is rectangular in shape with opposite faces that are equal in size and parallel to each other. In the embodiment illustrated in FIG. 1, block 20 is formed of close grained hard wood and measures 14.60 mm in length and 19.05 mm in height and width. Block 20 has a groove 24 formed in a top face opening to front end 26. Groove 24 is 107.5 mm in length and 6.2 mm in depth. So constructed, groove 24 accommodates a wire coil 28 having an outside diameter between about 2.5 and 13.0 mm which covers the sizes of jump rings 30 typically used by a jeweler. If larger jump rings 30 are needed, wire coil stabilizer 18 may be scaled accordingly.

With continuing reference to FIG. 1, tracking plate 22 is illustrated as a rectangular member preferably formed of a metal. Tracking plate 22 has an aperture 32 with flanking legs 34 configured to straddle and embrace block 20. Tracking plate 22 has a dependant central portion 36 in aperture 32 configured to fit inside groove 24. In the embodiment illustrated, tracking plate 22 is formed of twenty gauge (0.9 mm) sheet brass and measures 38.1 mm by 38.1 mm. Central portion 36 is formed as a half circle. The assembly comprising wire coil stabilizer 18 is completed with a removable stop 38 such as a pin inserted through aligned holes 40 with a diameter of 1.56 mm in sides 42 of block about 4 mm from front end 26. Stop 38 may be stored in a hole 44 that is 1.56 mm diameter and 28 mm in depth provided in front end 26.

As shown in FIG. 1, saw guide 46 portion of unit 10 includes a bottom slot 48 in the bottom of groove 24 opening to front end 26 of block 20. Bottom slot 48 is aligned with a slit 50 formed in central portion 36 of tracking plate 22. As illustrated, slot 48 is 94 mm in length and slit 50 is 10 mm in length.

Figure 11:
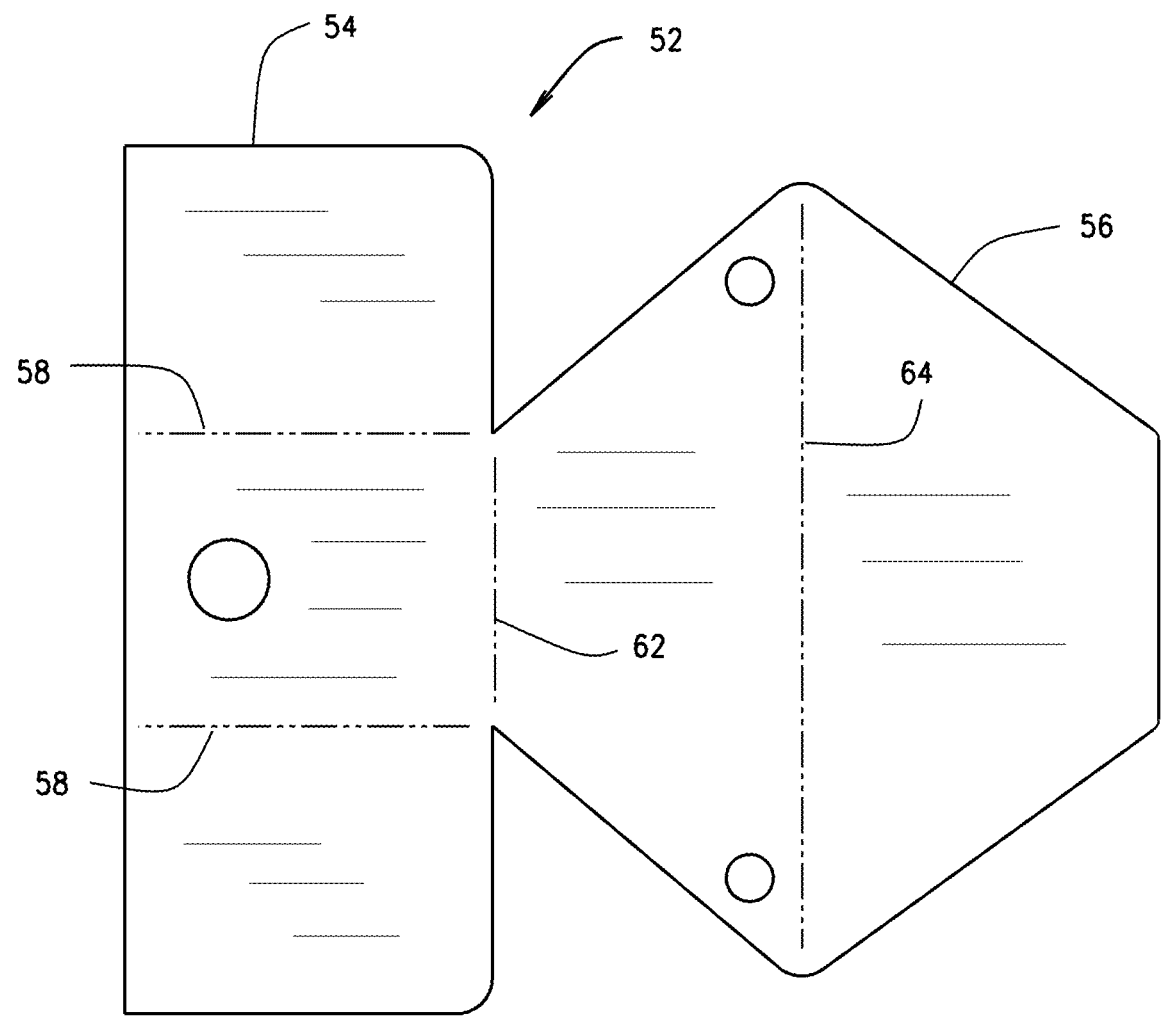

Turning to FIG. 11, bench clamp 12 as shown in FIG. 1 is formed from a template 42 having a rectangular base 54 to which is attached a hexagonal member 56. Ends of rectangular base 54 are folded along lines 58 to form sides 60 of bench clamp 12. Hexagonal member 56 is folded along lines 62, 64 to form back 66 and top 68. Holes are provided in back 66 such that bench clamp 12 may be screwed to jeweler's bench 16 as disclosed above. Block 20 may be firmly held in bench clamp 12 by tightening set screw 14.

Figure 2:
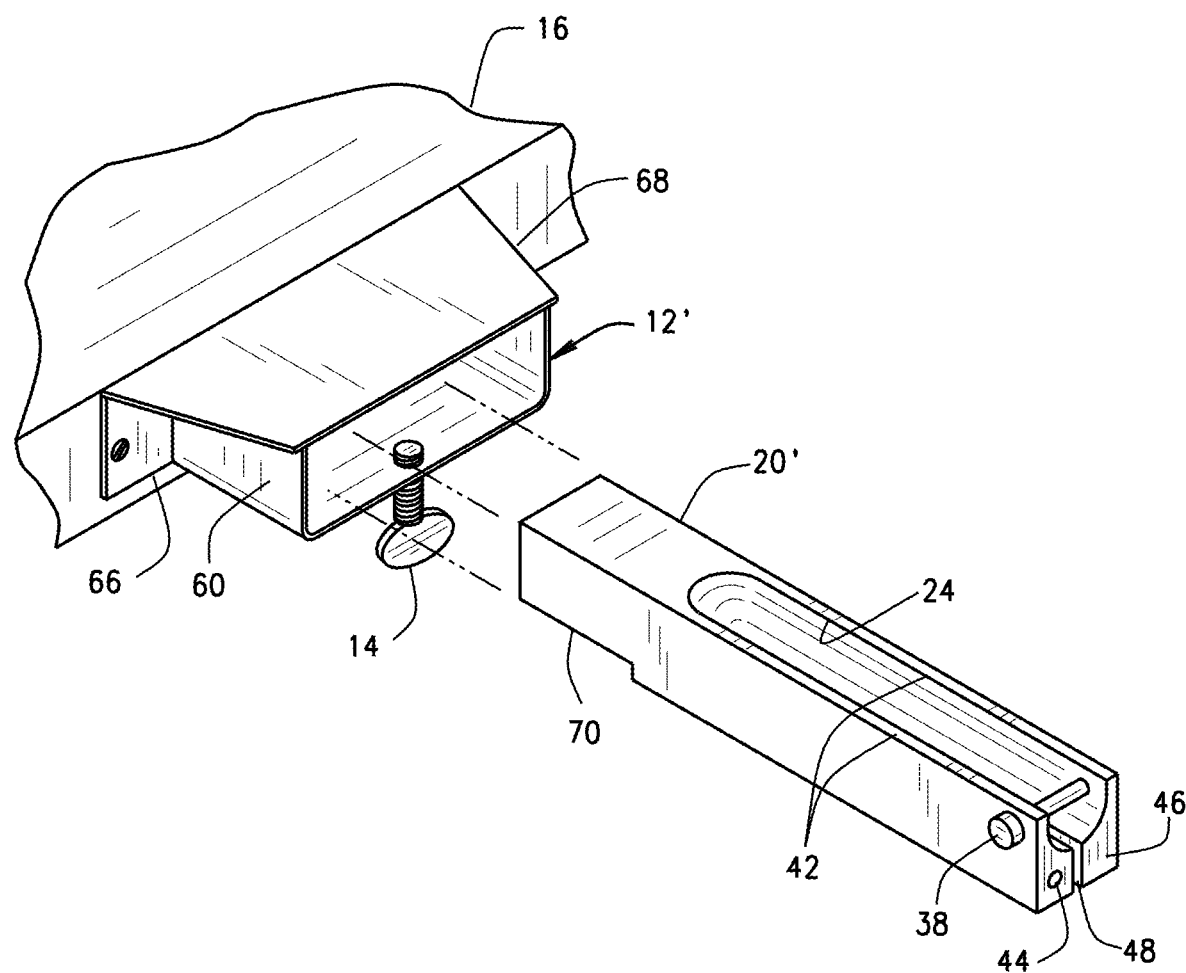
FIG. 2 is a perspective view of a second stabilizer for holding a wire coil in combination with a saw guide for attachment with a second bench clamp.
Figure 3:
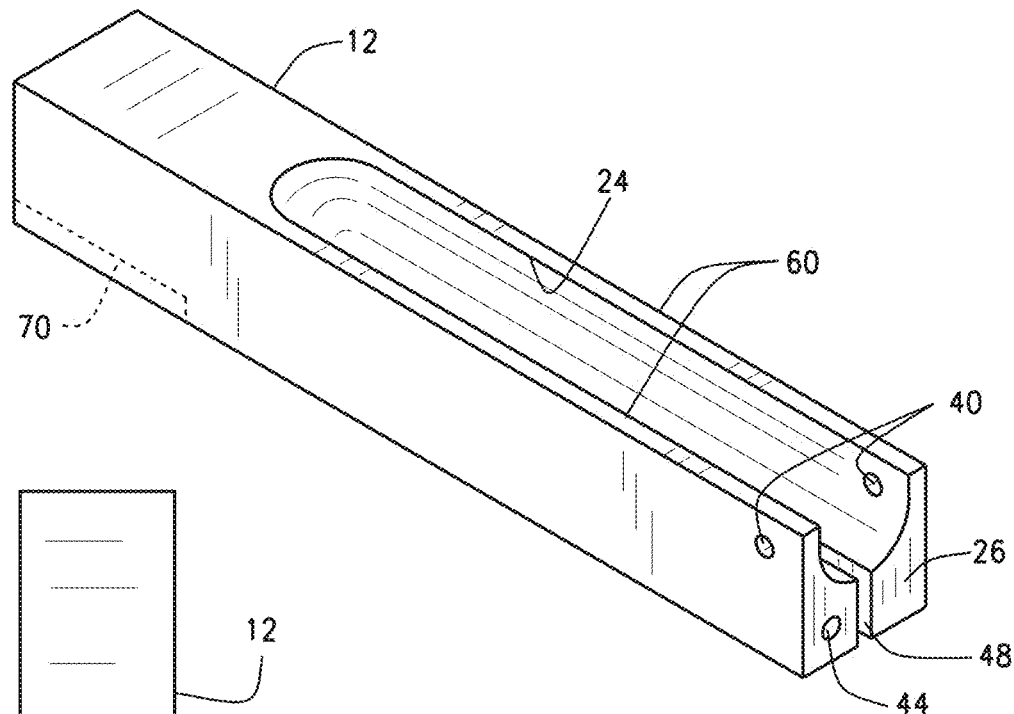
FIG. 3 is a perspective view of a block component of the first stabilizer.
Figure 4:
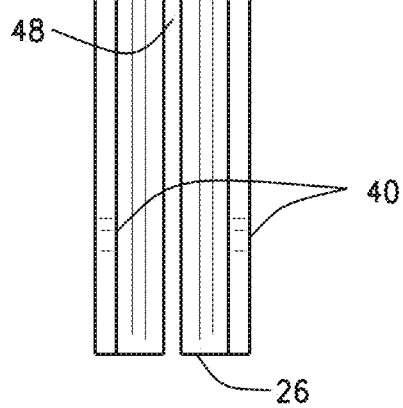
FIG. 4 is a plan view of the block.

In the embodiment of block 20' shown in FIG. 2, a notch 70 is formed on a bottom side of the block which is received in a standard jeweler's bench clamp 12'. Notch 70 stabilizes block 20' from lateral movement in bench clamp 12' when tightened therein with set screw 14.

It will be understood that wire coils 28 for making jump rings 30 come in different diameters and are formed from a host of different materials and wire gauges and that wire coil stabilizer 18 and saw guide 46 need to be scaled accordingly. Hence wire coil stabilizer and saw guide 10 shown in the drawings and described above will be understood by those skilled in the art as illustrative and non-limiting.

Figure 7:
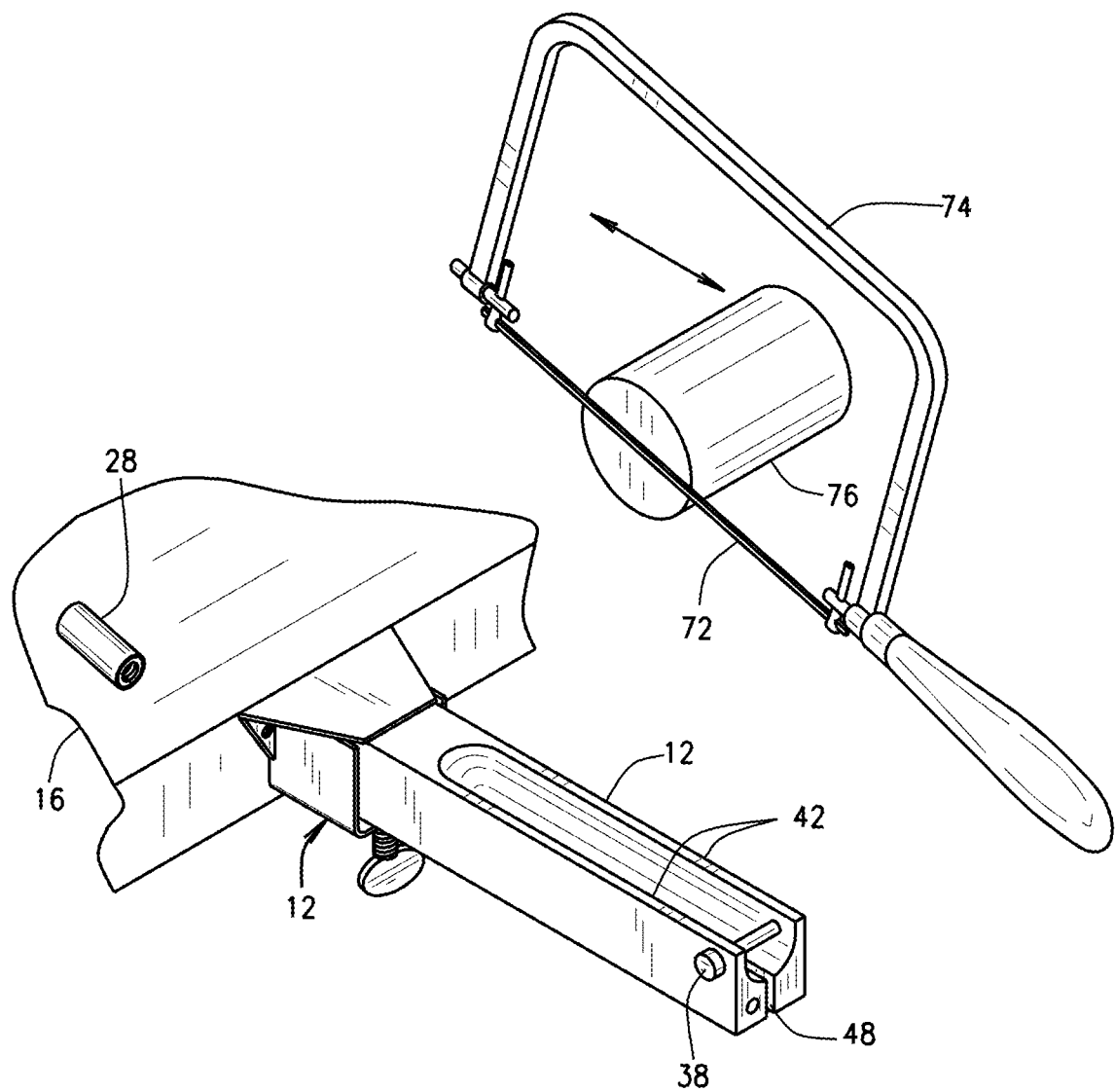
FIG. 7 is a perspective view of a saw blade of a jeweler's saw being lubricated.
Figure 8:
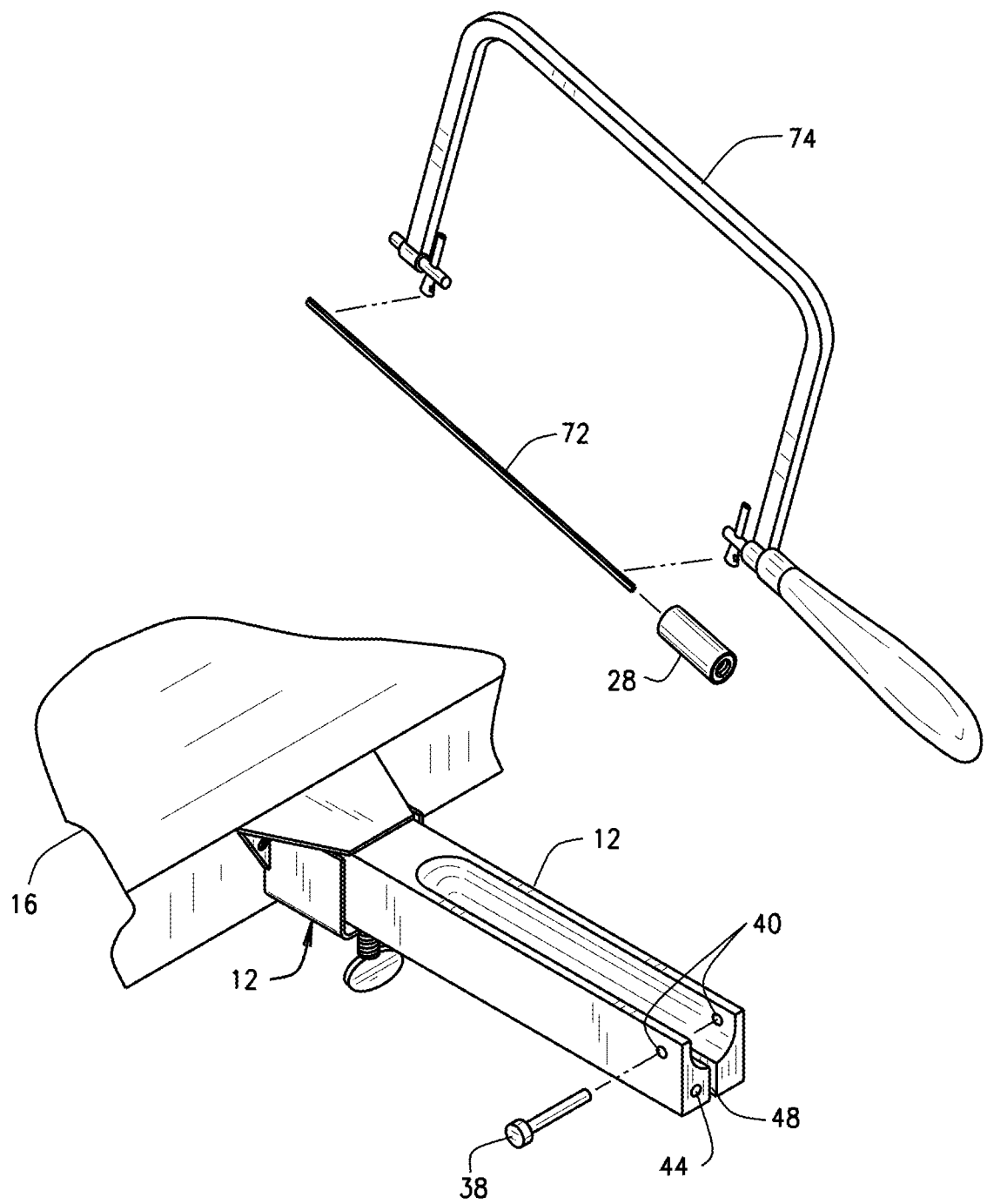
FIG. 8 is a perspective view of a coil of wire being inserted on the blade of the jeweler's saw.
Figure 9:
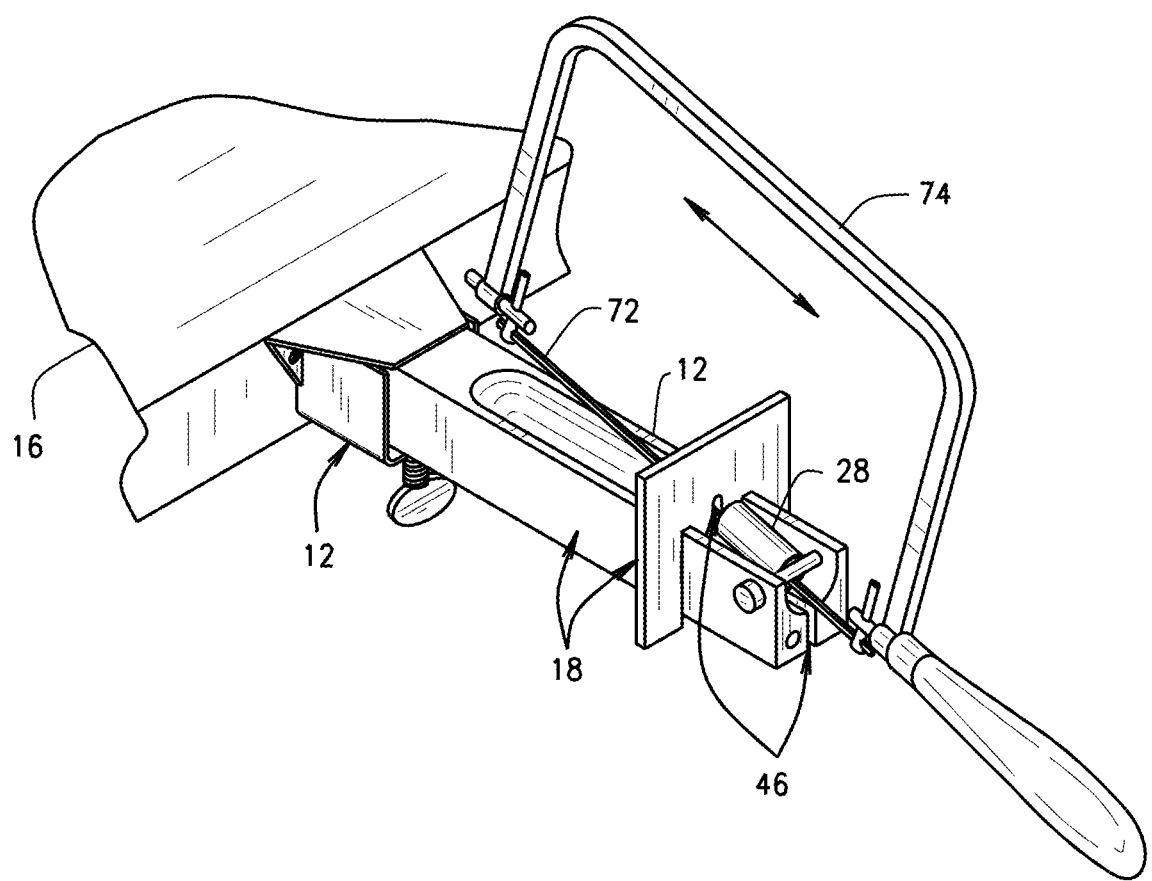
FIG. 9 is a perspective view the coil of wire being cut into rings with the jeweler's saw held in a saw guide formed by a groove in the block and a slot in the tracking plate.
Figure 10:
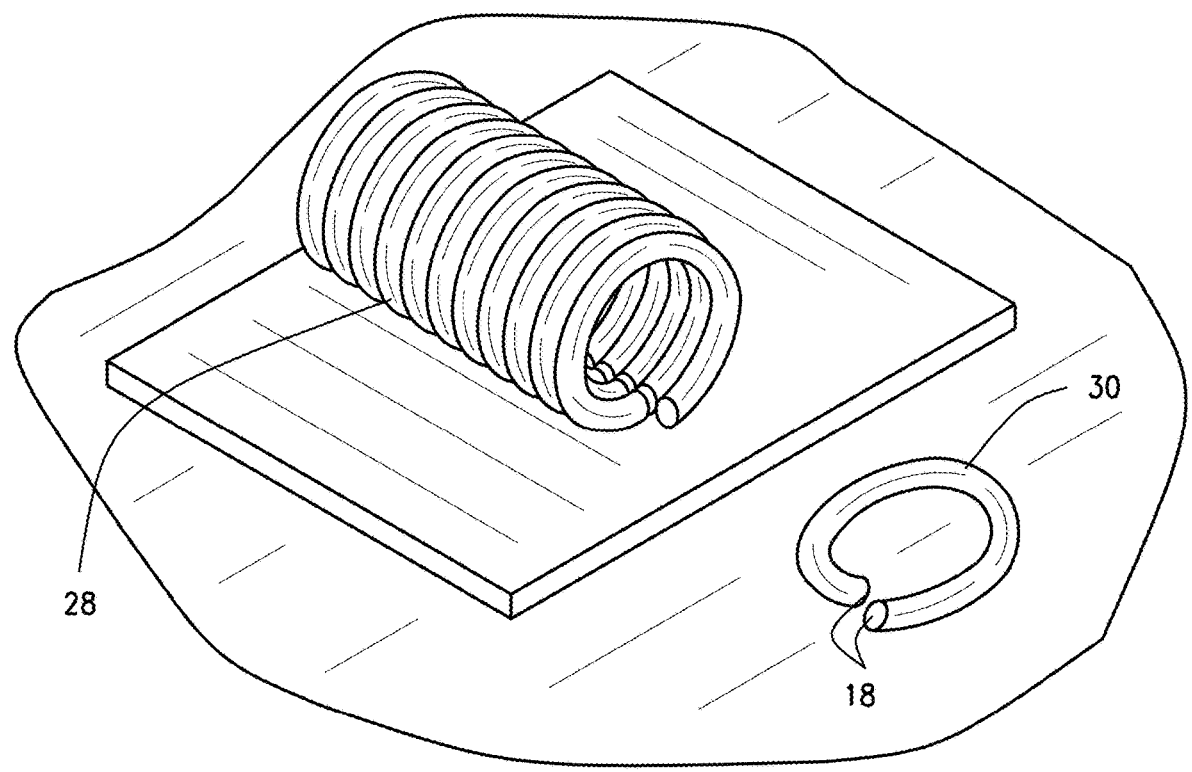
FIG. 10 is a perspective view of the coil of wire cut into a plurality of jump rings having flat end faces; and, FIG. 11 is a template for construction of a bench clamp as see in FIG. 1.

As shown in FIGS. 7-8, wire coil stabilizer and saw guide 10 may be used to cut jump rings 30. Beginning with FIG. 7, a saw blade 72 of a typical jeweler's saw 74 is oiled with a stick lubricant 76. After blade 72 has been lubricated, wire coil 28 previously formed on a mandrel (not shown) and covered with a layer of tape is threaded on saw blade 72 as shown in FIG. 8 and stop 38 inserted in aligned holes 40 in block 20, 20'. Continuing then to FIG. 9, wire coil 28 is positioned in groove 24 and tracking plate 22 inserted over the block. In this position, saw blade 72 is held in slot 48 formed in groove 24 and slit 50 formed in central portion 38 of tracking plate 22. At the same time, wire coil 28 is sandwiched and firmly held between tracking plate 22 and removable stop 38. Back and forth sawing motion of saw blade 72 results in cutting wire coil 28 into a plurality of jump rings 30 shown in FIG. 10 with flat ends 78. Sawing can continue through the entire wire coil 28 or be stopped when the number of jump rings 30 has been reached. When jump rings 30 are flattened by compression, flat ends 78 are spaced apart the distance of the saw kerf which can be closed by compression in the plane of the ring without distortion and with no sharp pointed ends that can catch upon a user's person or clothing.

As various changes could be made in the above constructions without departing from the scope of the invention, it is intended that all matter contained in the above description or shown in the accompanying drawings shall be interpreted as illustrative and not in a limiting sense.

What is claimed is:

1. A wire coil stabilizer and saw guide combination, said wire coil stabilizer comprising a block with a groove having a semi-circular bottom surface and side walls configured for receipt of a wire coil, a pin extending transverse to the groove and removably mounted to the side walls above the bottom surface of the groove and a tracking plate, wherein the tracking plate is slidably moveable within the groove to clamp a wire coil between the tracking plate and the removable pin, said tracking plate having an aperture flanked by legs configured to straddle and embrace the block, said tracking plate having a depending portion in the aperture configured to fit inside the groove; and, said saw guide comprising a slot in the bottom of the groove aligned with a slit with a closed top in the depending portion of the tracking plate when the depending portion of the tracking plate is in the groove, wherein said slit and slot are configured to accommodate a jeweler's saw blade with a coil of wire threaded on the blade for cutting the coil of wire from the inside to form jump rings.

2. The wire coil stabilizer and saw guide of claim 1 wherein the block is rectangular in shape with opposite faces that are equal in size and parallel to each other.

3. The wire coil stabilizer and saw guide of claim 1 wherein the tracking plate is rectangular and formed of metal.

4. A wire coil stabilizer and saw guide combination, said wire coil stabilizer comprising a rectangular block with side faces that are equal in size and parallel to each other and end faces that are parallel to each other and top and bottom elongated faces with a longitudinal groove having a semi-circular bottom surface and side walls in the top face opening to a first end face of said end faces, said groove configured for receipt of a wire coil, a pin extending transverse to the groove and removably mounted to the side walls above the bottom surface of the groove proximate the first end face, and a tracking plate wherein the tracking plate is slidably moveable within the groove to clamp a wire coil between the tracking plate and the removable pin, said tracking plate having an aperture flanked by legs configured to straddle and embrace the block, said tracking plate having a depending portion in the aperture configured to fit inside the groove; and, said saw guide comprising a slot in the bottom of the groove in the block aligned with a slit with a closed top in the depending portion of the tracking plate when the depending portion of the tracking plate is in the groove, wherein said slit and slot are configured to accommodate a jeweler's saw blade with a coil of wire threaded on the blade for cutting the coil of wire from the inside to form jump rings.

5. The wire coil stabilizer and saw guide of claim 4 wherein said removable pin is received in aligned holes in the block proximate the first end face.

6. The wire coil stabilizer and saw guide of claim 5 wherein the block has a notch in the bottom face and is received a second end face of said end faces opposite the first end face in a jeweler's bench clamp.

7. The wire coil stabilizer and saw guide of claim 5 wherein the block is received at the second end face in a bench clamp formed from a template having a rectangular base attached to a hexagonal member, said rectangular base having first and second fold lines forming side walls of the bench clamp, said hexagonal member having a first fold line where the rectangular base is attached to the hexagonal member forming a back wall of the bench clamp and a second fold line connecting opposing vertices forming a top of the bench clamp.

8. A wire coil stabilizer and saw guide combination, said wire coil stabilizer comprising a rectangular block with side faces that are equal in size and parallel to each other and end faces that are parallel to each other and top and bottom elongated faces with a longitudinal groove having a semi-circular bottom surface and side walls in the top face opening to a first end face of said end faces, said groove configured for receipt of a wire coil, a pin extending transverse to the groove and removably mounted to the side walls above the bottom surface of the groove proximate the first end face, and a tracking plate, wherein the tracking plate is slidably moveable within the groove to clamp a wire coil between the tracking plate and the removable pin, said tracking plate having an aperture flanked by legs configured to straddle and embrace the block, said tracking plate having a depending portion, said depending portion having a half circle shape configured to fit inside the groove; and, said saw guide comprising a slot in the bottom of the groove aligned with a slit with a closed top in the depending portion of the tracking plate, wherein said slit and slot are configured to accommodate a jeweler's saw blade with a coil of wire threaded on the blade for cutting the coil of wire from the inside to form jump rings.

9. The wire coil stabilizer and saw guide of claim 8 wherein the tracking plate is rectangular and formed of metal.

10. The wire coil stabilizer and saw guide of claim 8 wherein said removable pin is received in aligned holes in the block proximate the first end face.

\* \* \* \* \*